United States Patent Office 3,123,642
Patented Mar. 3, 1964

3,123,642
INDANYL AND TETRAHYDRONAPHTHYL
QUATERNARY AMMONIUM COMPOUNDS
Richard William Temple, Marlow, and Leslie Frederick Wiggins, Wargrave, England, assignors to Aspro-Nicholas Limited, Slough, England, a British company
No Drawing. Filed Nov. 21, 1960, Ser. No. 70,392
Claims priority, application Great Britain Nov. 20, 1959
9 Claims. (Cl. 260—567.6)

This invention relates to new quaternary ammonium compounds and to methods for the preparation thereof. The invention also relates to new tertiary amines which can be used in preparing some of the new quaternary ammonium compounds of the invention.

According to one aspect of the invention, there are provided new quaternary ammonium compounds having the general structural formula:

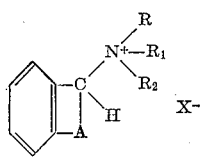

(I)

wherein (a) R, $R_1$ and $R_2$ are each a saturated or unsaturated lower alkyl group optionally substituted by one or more further groups, such as for example hydroxyl groups, or (b) R is a saturated or unsaturated lower alkyl group optionally substituted by one or more further groups such as for example hydroxyl groups, and $R_1$ and $R_2$ are joined together to form with the nitrogen atom a saturated heterocyclic ring optionally containing a further hetero atom, wherein $X^-$ is a non-toxic anion of an acid, such as for example a chloride, bromide, iodide, alkyl sulphonate or substituted or unsubstituted arylsulphonate radical, and wherein A is an alkylene chain containing 2 or 3 carbon atoms, which chain is optionally substituted on either of the two carbon atoms nearest to the aromatic ring by one or more further groups and which chain may contain a further hetero atom, such as for example an oxygen, nitrogen or sulphur atom, the values of R, $R_1$, $R_2$, A and $X^-$ being chosen so that when A is an ethylene chain, at least R is an unsaturated lower alkyl group, and when R, $R_1$ and $R_2$ are all methyl groups and A is an ethylene chain, $X^-$ is not an iodide radical. Throughout the specification, the term "lower alkyl group" is used as meaning an alkyl group containing from one to three carbon atoms.

It will be noted that the compounds having the general structural Formula I above contain an asymmetric carbon atom and may therefore be resolved into their optical isomers.

The preferred compounds of the invention are those in which R is an unsaturated alkyl group containing three carbon atoms, especially allyl, $R_1$ is a saturated lower alkyl group, for example methyl, or an unsaturated alkyl group containing three carbon atoms, for example allyl, and $R_2$ is a saturated lower alkyl group, for example methyl or ethyl, optionally substituted by a hydroxyl group, or in which R has the meaning defined above and $R_1$ and $R_2$ are joined together to form with the nitrogen atom a saturated heterocyclic ring containing four or five carbon atoms.

Preferably $X^-$ in Formula I above represents a bromide, iodide, or p-toluenesulphonate radical.

According to another aspect of the present invention there are provided methods for preparing the compounds having the general structural Formula I above.

In one method, a tertiary amine having the general structural formula:

(II)

wherein $R_1$, $R_2$ and A have the same meanings as in Formula I above, is reacted in an appropriate solvent, such as for example ethyl methyl ketone or acetone, with a compound of the general formula RX, wherein R has the same meaning as in Formula I above, to form the desired quaternary ammonium compound, which if desired, may be precipitated with ether and separated by filtration or decantation, and the resulting residue may be crystallised from an appropriate solvent or mixture of solvents, for example acetone and ether.

The tertiary amines having the general structural Formula II above, excluding those amines in which when A is an ethylene chain, $R_1$ and $R_2$ are both saturated lower alkyl groups, or are joined together to form with the nitrogen atom a saturated heterocyclic ring containing 4 or 5 carbon atoms, are novel compounds and are included within the scope of the invention.

In a second method, which may be employed in preparing the compounds of Formula I above in which $X^-$ is a chloride radical, a compound having the general structural formula

wherein A has the same meaning as in Formula I above, may be reacted with a tertiary amine of the general formula $$\begin{array}{c} R \\ | \\ N-R_1 \\ | \\ R_2 \end{array}$$

wherein R, $R_1$ and $R_2$ have the same meaning as in Formula I above, in an appropriate solvent to form the corresponding quaternary ammonium chloride.

The compounds of the invention have been found to possess varied pharmacological activity and in particular have been shown to be effective in causing in animals a selective block of the peripheral sympathetic (adrenergic) nervous system, without affecting the peripheral parasympathetic nervous system and without causing ganglion block.

The invention is illustrated by the following examples.

*Example 1*

Allyl bromide (30 g.) was added slowly with stirring to DL-1-(dimethylamino)-indane (25 g.) in acetone (150 ml.). There was a spontaneous reaction with the separation of an oil which crystallised on refluxing the mixture for 30 minutes. Ether (100 ml.) was added and the resulting solid was filtered off and dried in vacuo. The solid was recrystallised by dissolving in dry ethanol (40 ml.) and adding acetone (100 ml.) and ether (120 ml.) to give DL-allyl-dimethyl-(1-indanyl)-ammonium bromide, melting point 150–151° C.

*Example 2*

DL 1-chloro-indane (38.4 g.) was added over three hours to a solution of allylamine (40 g.) in dry ethanol (150 ml.) with stirring. The temperature of the solution was kept below 25° C. by cooling when necessary. After stirring for a further hour the solution was evaporated down on the water bath and aqueous potassium hydroxide solution was added to the residue. The precipitated oil was extracted with ether. The ether solution was extracted three times with N hydrochloric acid and the combined acid extracts were then washed twice with ether and basified with aqueous potassium hydroxide solution. The precipitated oil was extracted with ether and the ether extract was washed twice with water and dried over magnesium sulphate. After evaporating off the ether, the residue was distilled at 15 mm. pressure to give DL-1-(allylamino)-indane, B.P. 130–131° C.

9 g. of the DL-1-(allylamino)-indane were added to a mixture of 80% formic acid (3.5 g.) and water (3.0 ml.). Formalin (4.4 ml. 37%) was added and the mixture was heated on the steam bath for two hours. The solution was cooled and basified with aqueous potassium hydroxide solution and extracted three times with ether. The combined ether extracts were washed twice with water and dried over magnesium sulphate. The ether was evaporated off and the residue was distilled at 15 mm. pressure to give DL-1-(allyl-methyl-amino)-indane, B.P. 129–131° C.

4 g. of the DL-1-(allyl-methyl-amino)-indane were heated under reflux for six hours with ethyl methyl ketone (10 ml.) and ethyl iodide (8 ml.). Ether (30 ml.) was added and the precipitated solid was collected and recrystallised by dissolving dry ethanol (3 ml.) and adding acetone (7 ml.) followed by ether, dropwise, until crystallisation was complete, to give DL-allyl-methyl-ethyl-(1-indanyl)-ammonium iodide, M.P. 154–155° C.

*Example 3*

DL-1-(allyl-methyl-amino)-indane (5 g.), ethyl methyl ketone (15 ml.) and allyl bromide (8 ml.) were heated under reflux for four hours. After cooling, the precipitate was collected, washed with ethyl methyl ketone and recrystallised by dissolving in dry ethanol and adding ether until precipitation was complete, to give DL-diallyl-methyl-(1-indanyl)-ammonium bromide, M.P. 148–149° C.

*Example 4*

10 g. of DL-1-(dimethylamino)-1:2:3:4-tetrahydronaphthalene, 30 ml. of ethyl methyl ketone and 10 ml. of ethyl iodide were heated under reflux for six hours. After standing for a few hours and adding ether, crystallization occurred and the resulting material was collected. It had melting point 120–135° C. This material was dissolved in the minimum amount of ethanol and acetone was added, followed by ether dropwise. Dimethyl-diethyl-ammonium iodide, M.P. 304–306° C., crystallized out in large plates and was filtered off. More ether was added to the filtrate, precipitating crystalline material, M.P. 125–130° C. This was ground up with cold acetone and the residue collected. The residue had melting point 153–157° C. and was crystallized from acetone to give dimethyl-ethyl-[1-(1:2:3:4-tetrahydronapthyl)]-ammonium iodide M.P. 155–157° C.

We claim:

1. Quaternary ammonium compounds having the structural formula:

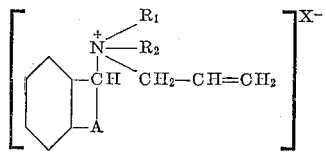

wherein $R_1$ is selected from the group consisting of allyl and alkyl groups having from one to about three carbon atoms, $R_2$ is selected from the group consisting of alkyl and hydroxyalkyl groups having from one to about three carbon atoms, A is an alkylene chain having from two to three carbon atoms, and X is a non-toxic anion.

2. Quaternary ammonium compounds in accordance with claim 1 wherein $R_1$ and $R_2$ are methyl.

3. Quaternary ammonium compounds in accordance with claim 1 wherein $R_1$ is methyl and $R_2$ is ethyl.

4. Quaternary ammonium compounds in accordance with claim 1 wherein A is ethylene.

5. Quaternary ammonium compounds in accordance with claim 1 wherein X is iodide.

6. Quaternary ammonium compounds in accordance with claim 1 wherein X is bromide.

7. Allyl-methyl-ethyl-1-indanyl ammonium iodide.

8. Allyl-dimethyl-1-indanyl ammonium bromide.

9. Diallyl-methyl-1-indanyl ammonium bromide.

References Cited in the file of this patent

UNITED STATES PATENTS

| | | |
|---|---|---|
| 2,144,446 | Williams et al. | Jan. 17, 1939 |
| 2,573,644 | Kerwin et al. | Oct. 30, 1951 |
| 2,625,567 | Heinzelmann | Jan. 13, 1953 |
| 2,691,676 | Hallock | Oct. 12, 1954 |
| 2,692,264 | Wojcik | Oct. 19, 1954 |
| 2,772,310 | Morris | Nov. 27, 1956 |
| 2,913,494 | Lobby | Nov. 17, 1959 |
| 2,916,490 | Schenck et al. | Dec. 8, 1959 |
| 2,921,094 | Shapiro et al. | Jan. 12, 1960 |
| 2,944,078 | Voterlaus et al. | July 5, 1960 |
| 2,951,788 | Lo et al. | Sept. 6, 1960 |

OTHER REFERENCES

Willstater et al.: Ber. Deut. Chem., vol. 46, pp. 527–535 (1913).

Brown et al.: Ber. Deut. Chem., vol. 55, pp. 3648–3663 (1922).

Courtot et al.: Ann. Chim., 10th series, vol. 4, pp. 246–251 (1925).